United States Patent
Jarrige et al.

(10) Patent No.: US 11,698,322 B2
(45) Date of Patent: Jul. 11, 2023

(54) SYSTEM FOR ESTIMATING WATER FLOWS AT THE BOUNDARIES OF A SUB-NETWORK OF A WATER DISTRIBUTION NETWORK

(71) Applicant: SUEZ INTERNATIONAL, Paris (FR)

(72) Inventors: Pierre-Antoine Jarrige, Montesson (FR); Aurélie Chazerain, Paris (FR)

(73) Assignee: SUEZ INTERNATIONAL, Paris (FR)

( * ) Notice: Subject to any disclaimer, the term of this patent is extended or adjusted under 35 U.S.C. 154(b) by 572 days.

(21) Appl. No.: 16/315,119

(22) PCT Filed: Jul. 6, 2017

(86) PCT No.: PCT/EP2017/066905
§ 371 (c)(1),
(2) Date: Jan. 3, 2019

(87) PCT Pub. No.: WO2018/007506
PCT Pub. Date: Jan. 11, 2018

(65) Prior Publication Data
US 2019/0310159 A1    Oct. 10, 2019

(30) Foreign Application Priority Data
Jul. 8, 2016  (EP) ..................... 16305868

(51) Int. Cl.
*G01M 3/28* (2006.01)
*G01M 3/00* (2006.01)

(52) U.S. Cl.
CPC .............. *G01M 3/28* (2013.01); *G01M 3/007* (2013.01); *G01M 3/2815* (2013.01)

(58) Field of Classification Search
CPC ....... G01M 3/28; G01M 3/007; G01M 3/2815
See application file for complete search history.

(56) References Cited

U.S. PATENT DOCUMENTS 4,562,552 A   12/1985 Miyaoka et al.
7,920,983 B1 *  4/2011 Peleg .................. G01M 3/2807
                                                    702/100
(Continued)

FOREIGN PATENT DOCUMENTS

CN    102677740 A    9/2012
CN    105716803 A    6/2016
(Continued)

OTHER PUBLICATIONS

English translation of the Notification of the First Office Action issued in Chinese Patent Application No. 201780042214.7 dated Jun. 30, 2020.
(Continued)

*Primary Examiner* — Alexander Satanovsky
*Assistant Examiner* — Lynda Dinh
(74) *Attorney, Agent, or Firm* — BakerHostetler (57) ABSTRACT

A system for measuring water flows in a sub-network of a water distribution network is provided. The system includes a plurality of sensors, for example pressure sensors, on the network. The system further comprises communication links between the sensor and one a computing device, and a measurement acquisition system. The computing device is configured to retrieve values of measurements, directly or through the measurement acquisition system; use values of measurements to determine values of control variables of a model of the water distribution network which minimize residue values between measurements values and predicted physical values on the network; then use the model parameter with the values of control variables to calculate water flows at the boundaries of the sub-network.

14 Claims, 7 Drawing Sheets

(56) References Cited

U.S. PATENT DOCUMENTS

| | | | | |
|---|---|---|---|---|
| 8,635,051 | B1* | 1/2014 | Wu | G06N 3/126 |
| | | | | 703/9 |
| 8,789,768 | B2* | 7/2014 | Hunnicutt | B05B 3/0486 |
| | | | | 239/222.17 |
| 9,285,290 | B2* | 3/2016 | Chatzigeorgiou | G01M 3/18 |
| 2013/0197833 | A1* | 8/2013 | Israeli | G01M 3/2815 |
| | | | | 702/51 |
| 2014/0121999 | A1* | 5/2014 | Bracken | G01M 3/243 |
| | | | | 702/51 |
| 2014/0163916 | A1* | 6/2014 | Ba | G06Q 50/06 |
| | | | | 702/100 |
| 2016/0208952 | A1* | 7/2016 | Howitt | F16K 37/0075 |

FOREIGN PATENT DOCUMENTS

| | | |
|---|---|---|
| CN | 105740989 A | 7/2016 |
| JP | 2010-48058 A | 3/2010 |
| SG | 193083 A1 | 9/2013 |
| WO | 2012/036633 A1 | 3/2012 |

OTHER PUBLICATIONS

Piller, "Modeling the behavior of a network—Hydraulic analysis and sampling procedures for parameter estimation", PhD thesis in Applied Mathematics from the Mathematics and Computer Science Doctoral School at the University of Bordeaux (PRES), 1995.

* cited by examiner

SYSTEM FOR ESTIMATING WATER FLOWS AT THE BOUNDARIES OF A SUB-NETWORK OF A WATER DISTRIBUTION NETWORK

CROSS-REFERENCE TO RELATED APPLICATIONS

This application is a National Stage of International patent application PCT/EP2017/066905, filed on Jul. 6, 2017, which claims priority to European Patent Application No. EP 16305868.8, filed on Jul. 8, 2016, the disclosures of which are incorporated by reference in their entirety.

FIELD OF THE INVENTION

The present invention relates to the management of a water distribution system. More specifically, it relates to the estimation of input and output water flows of a sub-network of a water distribution system.

BACKGROUND PRIOR ART

A system for distributing water is notably made of pipes between one or more water head and consumers, along with control devices such as valves and pumps. Such system can be subject to numerous anomalies. Anomalies belong to a plurality of types. Hydraulic anomalies comprise leaks, abnormal variation of pressure, fast drop of the water level of a storage tank, incoherent mass balance of storage. Operation anomalies define an element in the system which is in an incorrect state, for example a valve in an opening state different from the one stored in the information system. These anomalies, especially leaks, can dramatically reduce the performance of the water distribution system. For example, leaks in the pipes and service connections are the cause of a loss of a significant part of the water between water head and consumers, and can cause structural damages. The detection and correction of anomalies in a water distribution system is therefore a permanent concern of the operators of such systems in order to mitigate the economic cost of water loss and damages. Moreover, the detection of leaks in a water distribution system is a key objective for limiting the global water consumption and waste, which is of particular interest in regions subject to water stress, and in view of promoting sustainable development.

Estimation of input and output water flow of a sub-network of a water distribution system has a number of important applications for the management of a water distribution system. It is used at several levels of decision: at the assessment and strategic level, for example, as a key factor to determine the asset renewal strategy on a monthly to yearly basis; at the monitoring level, to follow hydraulic conditions, the water demand and level of losses in the network, on a weekly to monthly basis, and adapt the network management; finally, at the operational level (daily to weekly basis), it is used to organize the operation of the network (leak detection and repair, maintenance activities, etc.) . . . .

A straightforward solution to estimate the input and output flows for a sub-network of a water distribution network is to close valves in order to physically limit the number of pipes between a sub-network and the rest of the water distribution network to a very low number, possibly down to a single open pipe, and measure the water flow only at the open pipes using a flow measurement device called flow meter. This solution is for example used by so-called District Metered Areas (DMA). The traditional size of a DMA usually ranges from 500 to 4000 service connections. This solution has several drawbacks. Amongst other drawbacks, it is very expensive to implement, because of the number of valves and flow meters to install/operate. It is also very difficult to modify the sub-networks, because it requires operating valves physically. It also reduces water quality due to water stagnation in the closed pipes, increases the risk for interruption of supplies and/or the risk of valve blockage in case of emergency, and reduces the hydraulic efficiency of the network, especially in case of high demand.

The SG193083 patent discloses a method to estimate input and output flows for different sub-networks of a water distribution network, without the need to operate the valves physically. The solution disclosed by SG193083 relies on a water distribution network organized around a main pipe, with secondary pipes around the main pipe. Remote sensors are placed in different locations of the main pipe, and, when a drop of pressure is detected between two successive sensors, a possible leak is detected, in a sector between the two sensors. This method advantageously allows the detection of leaks without the need to close valves in the sub-network. However, the method disclosed in the patent SG193083 is limited to a specific topology of networks, organized around a main pipe. Thus, the only possible limitation of sub-networks corresponds to a separation of sub-networks around the main pipe.

The are many use cases, wherein it may be useful to calculate the input and output flow for a given sub-network, for example on an administrative or contractual breakdown, without the need to physically place and close valves. None of the prior art solution is able to achieve this result. Indeed, solutions such as DMA rely on a physical operation of valves, while the solution disclosed by SG193083 is only operative if the sub-networks are disposed around a main pipe, has a limited scope of application.

There is therefore the need for a method to reliably calculate input and output flows of any sub-network of a water distribution system, without the need to physically place flow meters or close valves at the arcs of the sub-network.

SUMMARY OF THE INVENTION

To this effect, the invention discloses a method for estimating, for a water distribution network composed of a network of nodes, one or more water flow rates at boundaries of a sub-network of the water distribution network, said method comprising: parameterizing a hydraulic model of the water distribution system with a set of values of control variables characterizing the network and its output at the nodes; using sensors on the water distribution network to acquire observations of a subset of state variables of the water distribution network at successive time references; determining the set of values of control variables which minimize differences between prediction and observations of the subset of state variables by applying an optimization procedure; calculating, based on the determined set of values of control variables, said one or more water flow rates at boundaries of the sub-network, for a period of time.

Advantageously, the water distribution network is modeled as a graph, and the sub-network is defined as a connected subgraph of the graph.

Advantageously, the sensors on the network acquire measurements at least relative to water pressure at a subset of nodes of the network.

Advantageously, the sub-network is predefined, and the sensors of the networks are iteratively placed in order to limit, at each iteration, one the maximum distance and the maximum pseudo-distance between any sensor and any node.

Advantageously, said optimization procedure comprises a stepwise adjustment of the set of values of control variables and a break criterion based on residue values of the state variables.

Advantageously, the stepwise adjustment of the control variables comprises: A) changing the set of values of the control variables; B) using the hydraulic model to calculate predicted values of a set of state variables characterizing at least water velocity at the arcs and pressure at the nodes at the time references; C) computing residue values of the set of state variables as a difference between predicted values and observed values at the time references; D) changing the set of values of the control variables and going back to step B) if said difference does not satisfy a break criterion.

Advantageously, the method further comprises adding control variables in the set of control variables, and going back to step B, if said difference does not satisfy a refinement criterion.

Advantageously, wherein computing residue values comprises calculating values of one of a least square, Bayesian objective function or absolute error function, and changing the set of values of control variables is determined by an iterative method comprising calculating one of a gradient or a Hessian.

Advantageously, the control variables comprise one or more of constant or time-based consumption profiles of users.

Advantageously, consumption profiles of users are defined for a plurality of different categories of users.

Advantageously, control variables further comprise an estimation of water loss coefficient in the sub-network.

Advantageously, control variables further comprise an estimate of a water loss coefficient for at least one area, an area comprising at least a node based on a distance or a pseudo-distance to the sensors.

The invention also discloses a system comprising a water distribution network, the system adapted to estimate one or more water flow rates at boundaries of a sub-network of the water distribution network, said system further comprising: sensors of at least one of pressure, flow rate or water level of water tanks in the water distribution network; a computing device comprising a processor; communication links between sensors and one of the computing device or a measurement acquisition system; a storage media; wherein the computing device is configured for: retrieving a set of values of control variables characterizing the network and its output at the nodes from the storage media and using it to parametrize a hydraulic model of the water distribution system; acquiring observations of a subset of state variables of said water distribution network, said observations having time references, by either: using communication links between sensors and the computing device, or retrieving observations in the measurement acquisition system; executing a method of the invention.

The invention also discloses a computer program product, stored on a non-transitory computer-readable medium, for estimating, for a water distribution network, one or more water flow rates at boundaries of a sub-network of the water distribution network, said computer program product comprising code instructions for executing a method of the invention.

The invention provides a reliable estimation of input and output water flow for any sub-network of a water distribution network, because the water flows are calculated based on accurate values of control variables of a model of the network.

The method is general and is not restricted to a specific network topology or distribution scheme, because calculating the values of control variables of a hydraulic model of the water distribution network renders the method applicable for different positions of the sensors on the network and natures of distribution system.

It can be used for distribution systems fed by gravity from a storage tank, by pumping, by a combination of one or more of each source type, because it is possible to model any water feed with a water distribution network modelling software.

The invention allows estimating input and output water flows of any sub-network of the network, without impact on the behavior of the network itself, because calculating the values of control variables of a hydraulic model of the water distribution network allows estimating water flow in an arc of the network, without needing physically having a water flow sensor in the arc, and without closing valves.

The method of the invention has a limited computational and instrumentation cost, due to the use of one of a gradient and a Hessian, which limits the number of iterations required to calculate accurate values of control variables.

The method of the invention does not require any hydraulic modification of the water distribution network. The method does not require physical boundaries between the sub-network and the remaining network, because an estimation of water flow is available for each arc of the network, and sub-networks for which calculating water flows can be freely designed.

The method reduces the cost of operating a water distribution network, because it does not require physical or hydraulic modifications of the network, and because it is possible to use it with only pressure sensors, which have a lower relative cost than water flow sensors.

The method can be used to estimate simultaneously the inflow of two or more sub-networks. In such a case, sub-networks are allowed to overlap partially or totally, because estimations of water flow for an arc can be used for a plurality of sub-networks connected to said arc.

The method of the invention allows to efficiently detect and pre-locate leaks in a water distribution network, due to the correlation between inconsistencies between input and output water flows, and leaks in the network.

The method of the invention can be used on any topology of a water distribution network, and any type of hydraulic operation (for example pumping, gravity feed, etc . . . ) of a water distribution network, because control variables the hydraulic model can be set to match the behavior of any network.

BRIEF DESCRIPTION OF THE DRAWINGS

The invention will be better understood and its various characteristics and advantages will emerge from the following description of a number of exemplary embodiments and its appended figures in which.

DETAILED DESCRIPTION OF THE INVENTION

In this specification, the invention will be described by way of examples related to the estimation of inflows time series for pre-defined sub-networks. However, the invention is not restricted to these examples and can be applied to the inflow estimation of any sub-networks breakdown in a water distribution system.

Figure 1A:
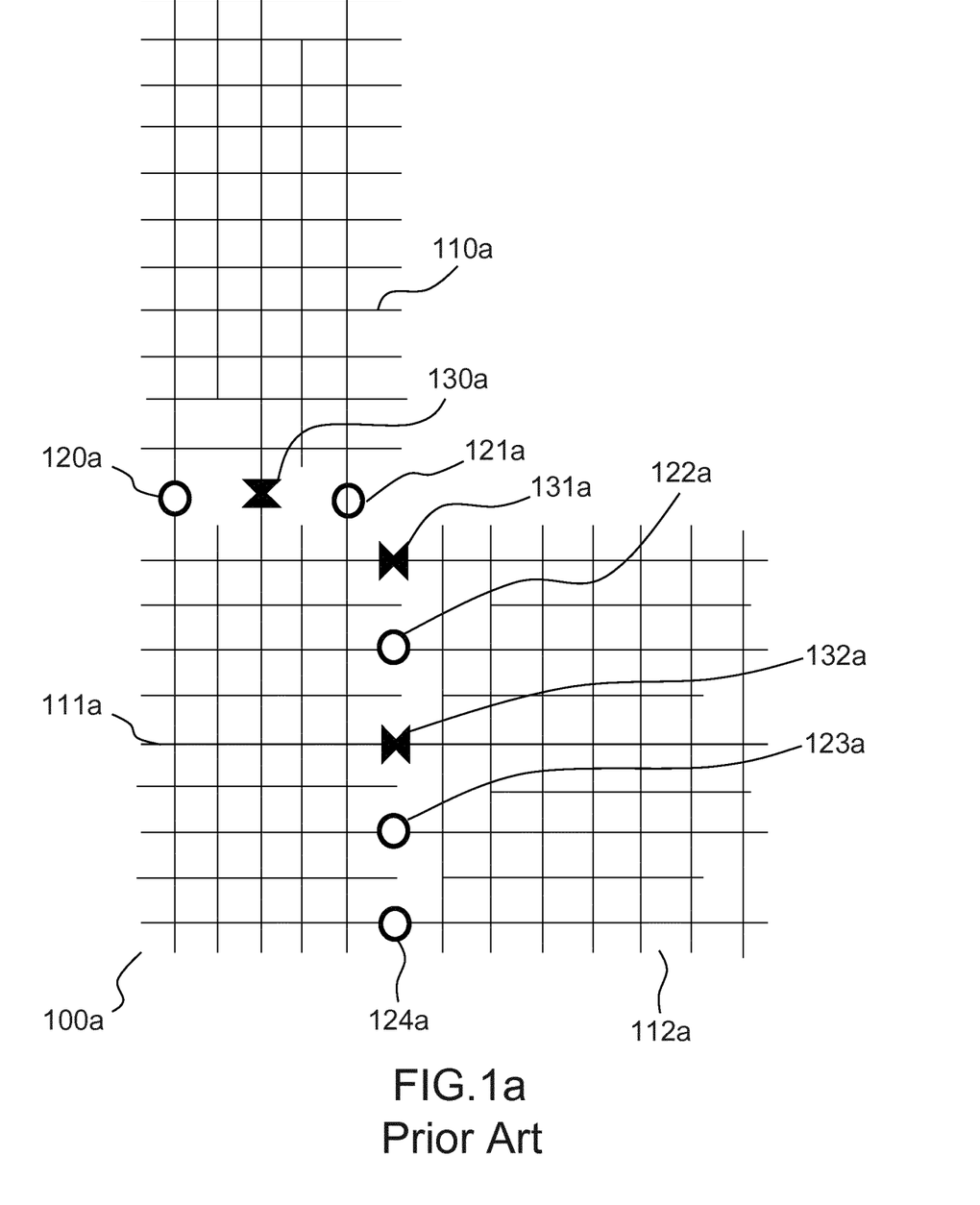
FIGS. 1a and 1b displays two examples of topologies of water distribution networks in the prior art, respectively a water distribution network physically separated into sub-networks for estimating input and output water flows of the sub-networks, and a water distribution network organized around a main pipe.
Figure 1B:
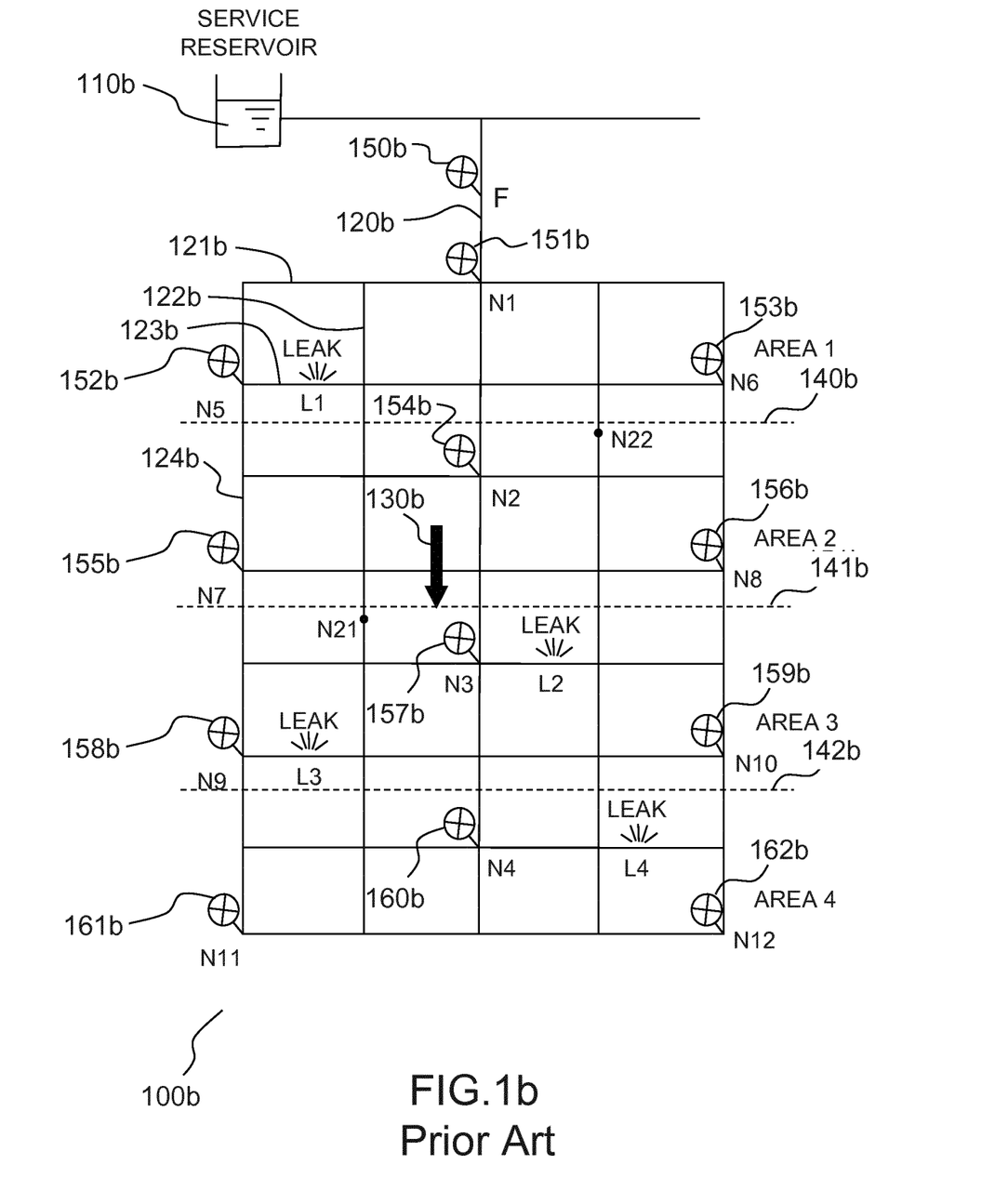

FIGS. 1a and 1b displays two examples of topologies of water distribution networks in the prior art, respectively a water distribution network physically separated into sub-networks for estimating input and output water flows of the sub-networks, and a water distribution network organized around a main pipe.

FIG. 1a displays a first example of topology of water distribution network in the prior art, with a DMA breakdown of a distribution system into three sub-systems. The water distribution network 100a is physically split into three sub-networks 110a, 111a, and 112a. The boundaries of each sub-system with the remaining part of the network are either equipped with a flow meter 120a, 121a, 122a, 123a, 124a or a closed valve 130a, 131a, 132a. The inflow of each sub-system is computed at any time as the algebraic sum of flow metered by the flow meters located on the boundaries.

As already highlighted, this solution has several drawbacks: it is very expensive to implement, because of the number of valves and flow meters to install/operate. It is also very difficult to modify the sub-networks, because it requires operating valves physically. It also reduces water quality due to water stagnation in the closed pipes, increases the risk for interruption of supplies and/or the risk of valve blockage in case of emergency, and reduces the hydraulic efficiency of the network, especially in case of high demand.

FIG. 1b displays a second example of topology of water distribution network in the prior art, wherein the water distribution network is organized around a main pipe. This solution is for example disclosed in the patent SG19308.

The water distribution network 100b is used to deliver water from a service reservoir 110b. The water flows through a main pipe 120b, around which are disposed secondary pipes, for example pipes 121b, 122b, 123b and 124b. The water generally flows in the direction 130b, in the main and secondary pipes. It is possible, using this topology of network, to define successive sub-networks in the course of water, for example separated by the virtual borders 140b, 141b, 142b. This specific topology of networks also allows calculating the input and output flows of the successive sub-networks using a limited number of sensors, for example the flow meters 150b, 151b, 152b, 153b, 154b, 155b, 156b, 157b, 158b, 159b, 160b, 161b and 162b, and without closing valves.

The method disclosed in SG19308 allows estimating input and output flows for different sub-networks of a water distribution network, without the need to operate the valves physically. However, it is restricted to network with a topology like the network 100b, which are organized around a main pipe 120b. It is thus applicable to few water distribution networks, specifically designed for the use of this method.

Figure 2:
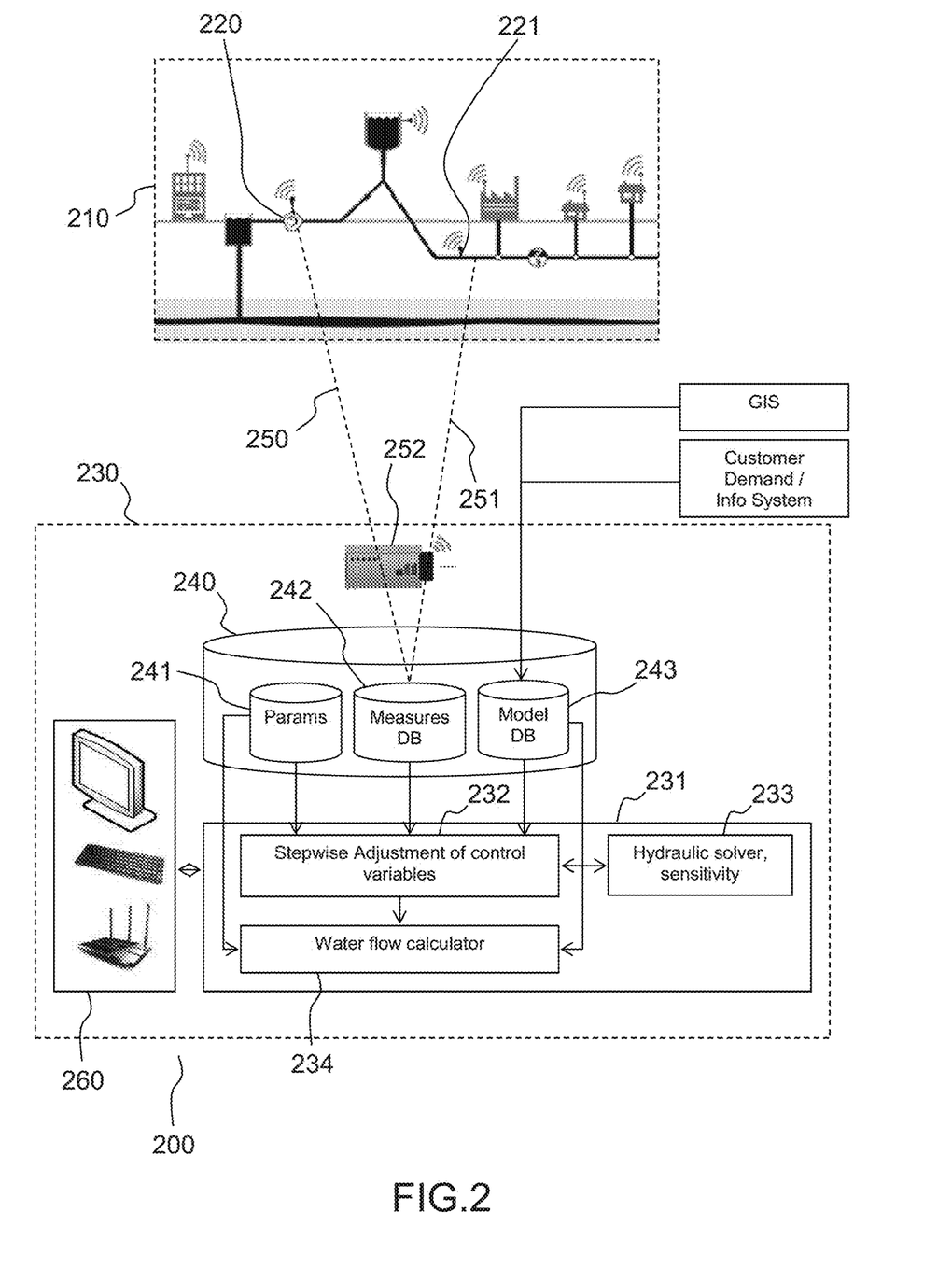
FIG. 2 displays an architecture of a system for implementing the invention.

FIG. 2 displays an architecture of a system for implementing the invention.

FIG. 2 displays a system 200 for estimating, for a water distribution network 210, one or more water flow rates at boundaries of a sub-network of the water distribution network.

The system 200 comprises sensors 220, 221 in the network comprising at least one sensor of pressure, at least one sensor of flow rate, or at least one sensor of water level of water tanks. Pressure sensors have the advantage of having a relative lower cost. Sensors of water levels of water tanks have the advantage of performing very precise measurements. More generally, any suitable sensor can be used. The system 200 further comprises a computing device 230 comprising a processor 231, and communication links 250 and 251 between sensors and one of the computing device and a measurement acquisition system, for example a SCADA (Supervisory Control And Data Acquisition) platform. In a number for embodiments of the invention, communication links 250, 251 are a radio link to a receiver 252. Many other implementations of the communication links are possible. For example, the sensors 220, 221 may send values to a concentrator, which is connected by a radio link or a cellular phone link to a modem in the computing device. Some parts of the communication link s may be formed by wire links, etc . . . . A skilled man may define, without effort, the relevant communication links in any case, for example by selecting one of the communication links which are well known in the field of water distribution system management. For example, measurements may be collected using a SCADA (Supervisory Control And Data Acquisition) platform.

The system 200 further comprises a storage media 240. In the example depicted in the figure, the storage media is located within the computing device. In other embodiments of the invention, the storage media can be located outside the computing device. For example, it may be a shared hard drive, or a remote database, which is accessed through requests by the computing device. In the example depicted in FIG. 2, the storage media comprises parameter settings 241, a measurement database 242, and a model database 243. The parameter settings 241 comprise all the necessary parameters to execute and parameter the invention. Measurement database 242 is used to store measurements from the sensors 220, 221. The measurements notably comprise values of physical parameters, and a timestamp with the date/time of the measures. Model database 243 comprises a model of the water distribution network 210. The model comprises control variables, which define the behavior of the model. These control variables may comprise variables such as the length or roughness of the pipes, issued for example from a GIS (Geographical Information System), and predictions of water consumptions of users, issued for example from a Customer Information System or an Automated Meter Reading system. The storage media 240 may for example be a hard drive, a Solid-State Drive, a Flash Memory, or any other known storage type. In alternate embodiments, parameter settings 241, measurements database 242, and/or model database 243 may be stored on different storage medias, within or outside the computing device 230.

Figure 3:
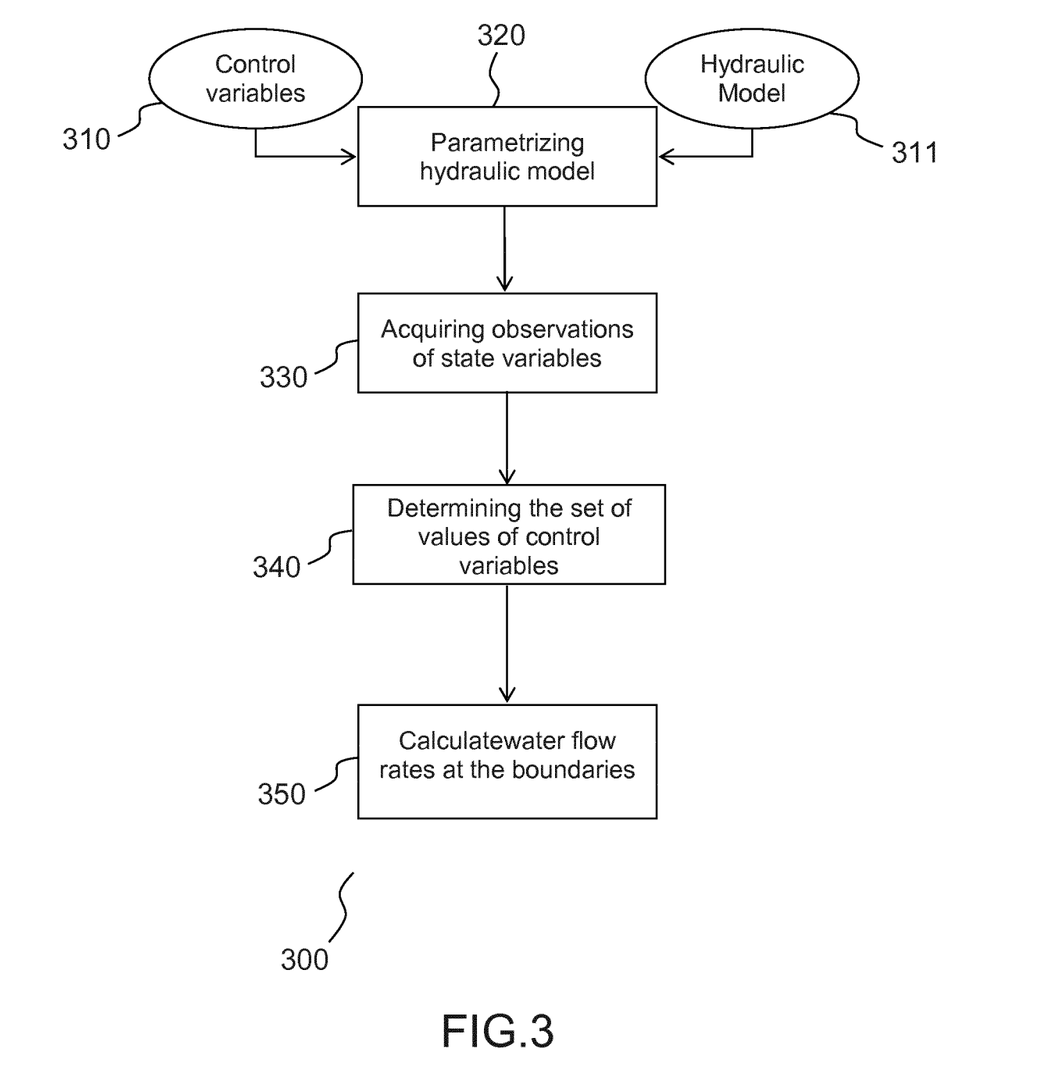
FIG. 3 displays a method of the invention.

The computing device 230 is configured for retrieving a set of values of control variables characterizing the network and its output at the nodes from the storage media and using it to parametrize a hydraulic model of the water distribution system, for example from the model database 243. It is further configured for acquiring observations of a subset of state variables of said water distribution network, said observations having time references. This may be done by directly using the communication links between sensors and the computing device. In preferred embodiments, this is done indirectly by reading values in the measurement database 242, measurements being for example collected by a SCADA platform. The computing device 230 is further configured to execute a method of the invention to calculate water flows at boundaries of the sub-network, for example the method 300.

In a number of embodiments of the invention, the processor 231 is configured, when loading a first set of instructions 232, to perform a stepwise adjustment of control variables, in order to diminish residue values between predictions and observations of state variables of the network, using values from both parameter settings 241, measurements database 242, and model database 243. In order to do so, the processor 231 is further configured, when loading a second set of instructions 233, to predict values of state variables, and identify possible changes of the control variables to reduce residue values of state variables. The processor 231 is further configured, when loading a third set of instructions 234, to calculate water flows at boundaries of a sub-network of the water distribution network 210, using the previously modified set of values of control variables.

The functional architecture 200 is provided by means of non-limitative example only, and a skilled man may easily identify other possible architectures. For example, the architecture may comprise input/output units 260 of the computing device, for example a screen, a keyboard and/or a router.

FIG. 3 displays a method of the invention.

The method 300 is a method for estimating, for a water distribution network composed of a network of nodes, one or more water flow rates at boundaries of a sub-network of the water distribution network.

In the invention, the network can be modeled as a graph, and the sub-network can be a connected subgraph of the graph. The sub-network is connected to the rest of the network by a finite set of arcs. According to various embodiments of the invention, the sub-network can be predefined, for example to match administrative boundaries, or can be defined for a specific purpose, for example to determine the presence or absence of a leak in a location wherein a leak is suspected.

The method 300 comprises a first step 320 for defining parameters of a hydraulic model 311 using a set of control variables 310. The nature of the hydraulic model and control variables has been presented in relation to FIG. 1. The hydraulic model can notably be configured with control variables characterizing the structure of the network and control variables characterizing a prediction of the inputs and outputs of the network at nodes over a set of time references, notably a prediction of water consumption in the network.

In a preferred embodiment, the values of the control variables related to the structure of the network (e.g. the diameter and roughness of the pipes, characteristics of equipments, etc . . . ) have been calibrated after the creation of the hydraulic model. Indeed, theoretical values defined during the modeling of the network do not always match real values. In order to obtain more accurate values of control variables related to the structure of the network, a calibration step may consist in adjusting the values of these control variables in order to provide the best prediction of the behavior of the network. Typically, this adjustment may consist in:
performing observations of the inputs, outputs and a subset of the state variables of the network for a certain duration;
configuring the hydraulic model of the network with values of the control variables related to the inputs, outputs and structure of the network;
calculating predicted values of the state variables of the network according to the hydraulic model;
calculating a difference between observed and predicted values of the state variables of the network, and modifying the values of the control variables of the network using an optimization algorithm in order to minimize the distance between observed and predicted values of the state variables of the network.

On the other hand, control variables related to the input and output of the network can be obtained for example using observations of the past inputs and outputs. For example, the values of control variables characterizing water consumption at different nodes can be calculated using historical metered data of water consumption.

The control variables representative of the output of the water distribution network at the nodes can also be modeled using both constant and time-based consumption profiles. In order to have a good approximation of the actual consumption profiles of the users, the consumption profiles can be defined for a plurality of different categories of users. For example, a domestic user category can be defined, with peaks of consumption in the morning and the evening. It is also possible to define non-domestic categories of users, such as a professional category, farmer category, industrial category, etc . . . . A large number of different categories can be defined, in order to obtain the most relevant classification of users.

The consumption profiles can be set using a comparison of parameters of a profile with measurement, for example using telemetry or automated meter reading (AMR). In an embodiment of the invention, consumption profiles are defined by timed coefficients of water consumption. According to various embodiments of the invention, consumption profiles may be defined at different level, for example for each area, for each type of consumer, or a combination thereof. Generally, consumption profiles with a higher number of degrees of liberty (by area+by types of user+other relevant criteria) provide a finer estimation of water consumption, but require a higher number of sensors to be properly set.

In a number of embodiments of the invention, control variables further comprise an estimation of water loss coefficients, for example in an entity, a sub-network, or the network as whole. Water loss coefficients allow the overall weighting of the entities losses. Water loss coefficients can also be defined with a water loss coefficient for different area, the areas being defined by associating every point of the network to the pressure sensor located at the smallest path (closest distance along pipes). The areas can also be defined by using a pseudo-distance to sensors, meaning that instead of using the pipe length the pseudo-distance makes use of another positive characteristic associated to each link such as the average hydraulic resistance, absolute head loss, demand density, or a weighted combination of two or more of them.

The method 300 further comprises a step 330 of using sensors to acquire observations of a subset of state variables, said observations having observations time references. A state variable is a timed value of a physical parameter at an entity of the network. State variables often relate to physical values at a node of the network (for example, pressure or concentration of chlorine at a node of the network). They may also relate to physical values at an arc of the network, for example water velocity in a pipe. Parts of prior art methods and the invention rely on a comparison of observations and predictions of state variables. Observations of state variables are only possible if an adequate sensor is present. For example, an observation of pressure at a node of the network can be performed only if a pressure sensor is present at this node. On the other hand, it is possible to calculate predicted values of state variables at nodes or other entities which are not equipped with sensors, using a hydraulic model. The observations time references are associated to each sensor, which is able to produce measurements at different times/rates. According to various embodiments of the invention, the observations time references of each sensor may be synchronized, or each sensor may have its own time references. In both cases, execution of the next steps of the method of the invention will be the same.

A water distribution system is typically equipped with sensors, which measure physical parameters such as velocity, flow rate, pressure, etc. at the nodes or the arcs of the network, said physical parameters at a node or an arc being state variables of the network. For practical reasons of cost, maintenance and easiness of operation, not all nodes and arcs are equipped with sensors, and those equipped with sensors are usually not equipped with a sensor for each physical parameter. The number and distribution of sensors can be chosen in accordance with the definition of sectors of the water distribution system. The acquisition of observations can be performed remotely. For example, the sensors which are deployed along the network can send the values of state variables to a remote platform through various telecom means, usually wireless links.

The values of state variables vary over time, each value has a time reference that represents the time at which the value has been measured. In an embodiment of the invention, values of state variables are acquired using a predefined time period and sent regularly, possibly but not necessarily, using another period. For example, values of the state variables for which a sensor is present can be acquired and sent every two minutes, 5 minutes, 15 minutes or every hour each 24 hours. In a preferred embodiment of the invention, sensors are synchronized in order to acquire measurements simultaneously. This allows the remote platform to acquire observations of the values of the subset of state variables for which a sensor is available at each time reference. Values can be sent immediately after being measured. They can also be stored locally at transmission device level, and then sent at regular intervals, for example by sending all values that have been captured during 15 minutes, 1 h or any other interval.

In a number of embodiments of the invention, the water distribution network is equipped with pressure sensors. The network can also be equipped with other sensors, for example water flow rate sensors in certain pipes. In some embodiments sensors are placed in the network independently of the sub-network. For example the sensors may be placed as homogeneously as possible in the network, at proximity of the pipes with the highest water flow rate, or at the nodes with the easiest possible access. In an embodiment of the method according to the invention, the sensors are iteratively placed in order to limit, at each iteration, the maximal distance or pseudo-distance between a sensor and a node. For example, sensors can be placed using the following steps: first initialize a first set of sensors, for example a set of pressure sensors at each water tank or entry point of the network. Then, at each iteration, find out the node with the largest distance or pseudo-distance to any sensor, and place a sensor at this node, until a stop criterion is met. In an embodiment of the invention, the stop criterion is a maximum number of sensors. This embodiment allows, for a given number of sensors, limiting the maximal distance between any node and any sensor. In another embodiment of the invention, the stop criterion is a threshold of maximal distance or pseudo distance between any node and any sensor: sensors are iteratively added until the maximal distance between any node and any sensor is below the threshold. This embodiment allows having the smallest possible number of sensor in order that each node is the network has a sensor at a distance or pseudo distance on or below the threshold. In other embodiments the sensors are placed according to the sub-network. For example, the sensors can be placed in order to allow a calculation of said one or more water flow rates at boundaries of the sub-network with an error below a predefined threshold.

The method 300 further comprises a third step 340 of determining the set of values of control variables which minimize differences between prediction and observations of the subset of state variables by applying an optimization method.

This step consists in determining values of control variables, that provide a reliable description of the water distribution network, which result in low differences between predictions and observations of state variables. According to various embodiments of the invention, state variables for which differences, which are also called residual values, are calculated belong to one or more types. For example, the step 340 can minimize residual values of pressure, but also water flow. Residual values can be calculated for all available sensors, in order to obtain the best global modeling of the network, or for all sensors within the sub-network, in order to obtain the most reliable result, within the sub-network.

Step 340 can be performed using different methods. For example, values of control variables can be calculated using an evolutionary or genetic algorithm. These algorithms provides a very reliable calculation of the values of control variables, but require a huge amount of processing capabilities to be executed, in the order of ten thousand to one hundred thousand hydraulic simulations. In other embodiments of the invention, the optimization method comprises a stepwise adjustment of the set of values of control variables, and a break criterion based on residue values of the state variables. This allows obtaining good values of control variables, at a computing cost in the order of ten to twenty times the computing cost of a single hydraulic simulation. An example of such a method is provided, with reference to FIG. 4.

The method 300 further comprises a fourth step 350 of calculating, based on the determined set of values of control variables, said one or more water flow rates at boundaries of the sub-network, for a period of time.

In a number of embodiments of the invention, step 350 of calculating, based on the determined set of values of control variables, said one or more water flow rates at boundaries of the sub-network, for a period of time, consists in using an initial state of the network, and the value of control variables, to calculate, for a period of time, state variables of the network comprising pressure and water flows. Then water flows at the boundaries of the network can be summed, for the period of time.

As explained earlier, this calculation can be used in several applications. It is used at several levels of decision: at the assessment and strategic level, for example, as a key factor to determine the asset renewal strategy on a monthly to yearly basis; at the monitoring level, to follow hydraulic conditions, the water demand and level of losses in the network, on a weekly to monthly basis, and adapt the network management; finally, at the operational level (daily to weekly basis), it is used to organize the operation of the network (leak detection and repair, maintenance activities, etc.) . . . .

Figure 4:
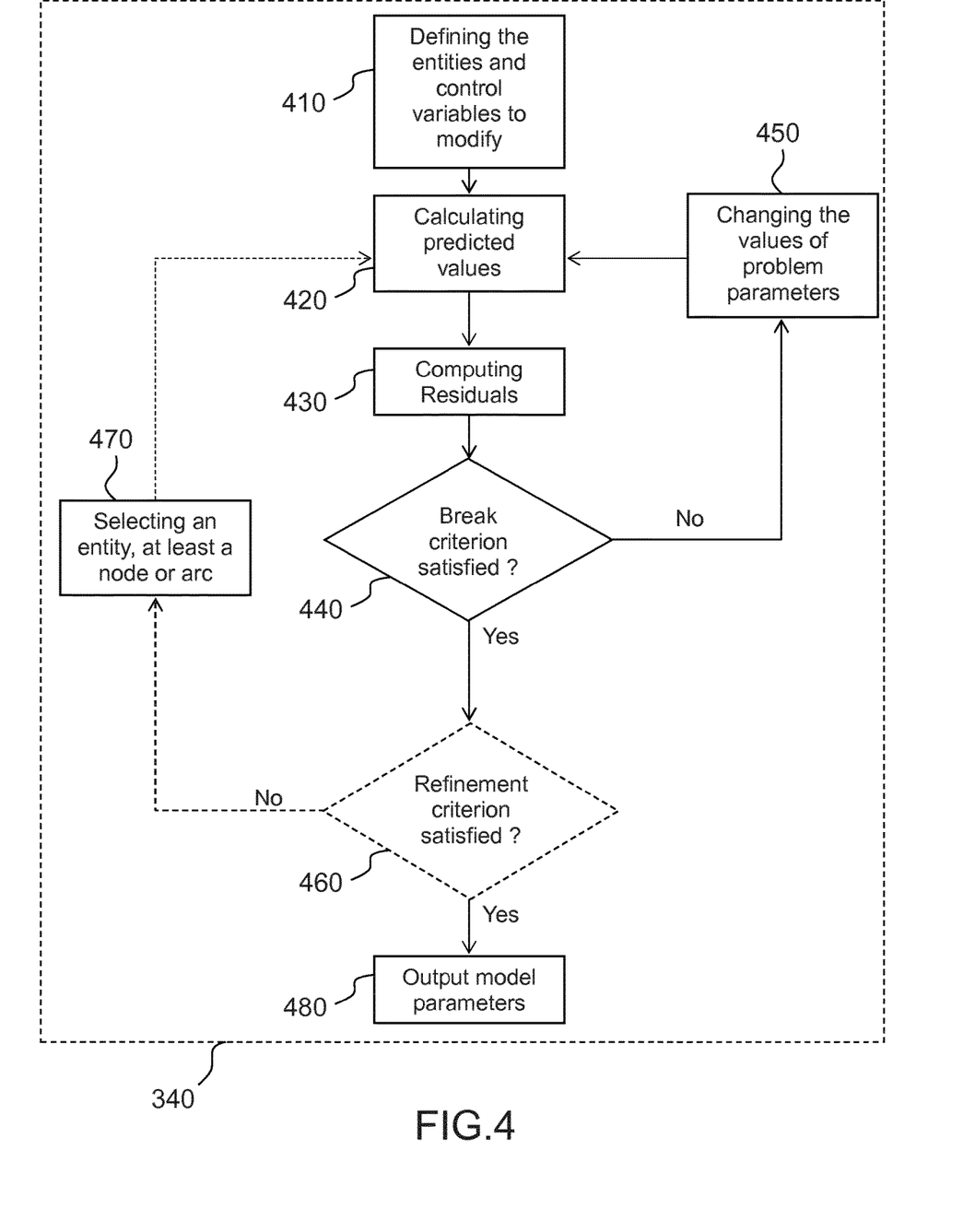
FIG. 4 displays a method for changing the values of control variables characterizing a water distribution network in a number of embodiments of the invention.

FIG. 4 displays a method for changing the values of control variables characterizing a water distribution network in a number of embodiments of the invention.

In a number of embodiments of the invention this method is used at step 340 and comprises a step 410 of defining the entities and control variables to modify. In a number of embodiments of the invention, control variables to modify are control variables representative of water consumption and water loss, for example time coefficients of the demand types described in the hydraulic model, and the coefficients of water loss per area. In other embodiments of the invention, further control variables may be used. For example, control variables representative of the state of valves may be modified. This may be useful, for example if a change of state of some valves has not been successfully transmitted. Thus, the method would be able to modify the state of one or more valves in order to have a more accurate model of the water distribution network.

In a number of embodiments of the invention, the step 340 further comprises a step 420 of using the hydraulic model to calculate predicted values of a set of state variables characterizing entities, at least velocity at the arcs and pressure at the nodes at simulation time references. This step consists in calculating a predicted value of state variables of the entity (network, its subsets, . . . ), at the simulation time references. The simulation time references can be chosen by the user independently of the observations time references. For example, the simulation time references can be separated by a predefined and constant interval (i.e. predicted values are calculated every 1 min, 5 min, or any other duration) and are not necessarily synchronized with the observations time references. Methods for using a hydraulic model to calculate predicted values of the state variables of a hydraulic network are well known by people skilled in the art of water system engineering. They typically consist in, starting from the tank state at a time reference and the values of control variables, using the physical law of hydraulics for computing values of all state variables at the same time reference, and then computing values of the tank state at the next time reference. It is then possible to calculate predicted values of the state variables at all time references starting from initial values of the state variables and values of the control variables. Methods for calculating predicted values of state variables at a time reference are notably disclosed by O. Piller, "*Modeling the behavior of a network—Hydraulic analysis and sampling procedures for parameter estimation*". PhD thesis in Applied Mathematics from the Mathematics and Computer Science Doctoral School at the University of Bordeaux (PRES), 1995, 288 pages, Talence, France.

The method further comprises a step 430 of computing residue values of the subset of the state variables as a difference between predictions and observations at the simulation time references. In case the simulation time references and the observations time references are not identical, values of observations can be calculated at the simulation time references, for example by building a continuous function of each observation at first time reference and picking values at desired simulation time references. Such a continuous function can be built in several ways. It may for example be built using an interpolation function or a regularization function. Several functions are adapted here, for example a Gaussian kernel convolution function. This step consists in computing differences between predicted and observed values of the state variables, for state variables for which observations are available. The observations of state variables may be either raw observations or pre-processed observations. Observed values of state variables may for example be pre-processed by smoothing, missing data imputation, etc. to clean the signal. In cases where the system is correctly modeled and calibrated, and the inputs and outputs of the network are correctly defined, then, if there is no actual anomaly, observations and predictions of the state variables are very close and the residue values are very close to the values of the residues at calibration of the model. Conversely, the residue values can be important, i.e. an anomaly occurs, like for example when a spatial consumption of water is wrong. An objective function is used to compute the importance of the residue values. The importance of the residue value may for example be calculated as a weighted norm, or a weighted average of the absolute value of each residue value. Weights associated with the different observations/residue can be defined according to the nature of the observation (flow, pressure . . . ), the brand and accuracy of the sensor, the time into the day, the empirical variance of the measurement. More generally, the weight can be automatically defined, or defined by a user, according to an indication of confidence of the measurement. The objective function can be for example a least square function, or a Bayesian objective function.

The method 340 further comprises a step 440 of verifying if the residue values satisfy a break criterion. This step consists in verifying if the residue values of state variables are small enough for considering that values of control variables accurately describe the behavior of the entity. The break criterion can be for instance a combination of a threshold on the number of iterations, a threshold on the variation of residue values, a threshold on the gradient of the objective function with respect to the set of parameters.

When the break criterion 440 is not satisfied, the method 340 comprises a loop step 450 to change the values of the problem parameters (for instance the consumption profile) using a numerical descent method. In an embodiment, the method can be a method comprising calculating a gradient, for example a gradient algorithm, a conjugate gradient algorithm. In an embodiment, the method can be a method comprising calculating one of a gradient and a Hessian, for example a Newton algorithm, a Levenberg Marquardt algorithm, or another algorithm of the same type. This step 450 feeds a new iteration of the step 420, using the hydraulic model to calculate predicted values with modified values of problem parameters.

In other embodiments of the invention, when the break criterion 440 is satisfied, the method 340 comprises a step 460 which is a test based on a refinement criterion. While the value of the objective function decreases, a further refinement step 470 is performed in the loop at step 420.

The method 340 further comprises a step 470 to add or redefine control variables in the set of control variables to modify. This step 470 feeds a new iteration of the step 420, using the hydraulic model to calculate predicted values on the selected elements. Thus, there are, at the next iteration, more degrees of freedom or more representative control variables to obtain a satisfying result.

In other embodiments of the invention, the method 340 comprises, instead of step 470, a step to select a subset of at least an element (node or arc). The step examines the gradient computed as the scalar product of an element (node or arc) sensitivity vector by an element contribution vector. The method discards the elements according to a selection criterion, based on sensitivity assessment. In an embodiment, those having a positive sensitivity are discarded. This step feeds a new iteration of the step 420, using the hydraulic model to calculate predicted values on the selected elements.

The method 340 further comprises a step 480 to provide the outputs of the model parameters. The model outputs include the adjusted parameters, the successive values of the element sets and related objective function, and characteristics which are processed at step 360 as shown in FIG. 3. The model outputs include therefore information on various entities, from specific node or arc to subset of the network and the whole network.

Figure 5A:
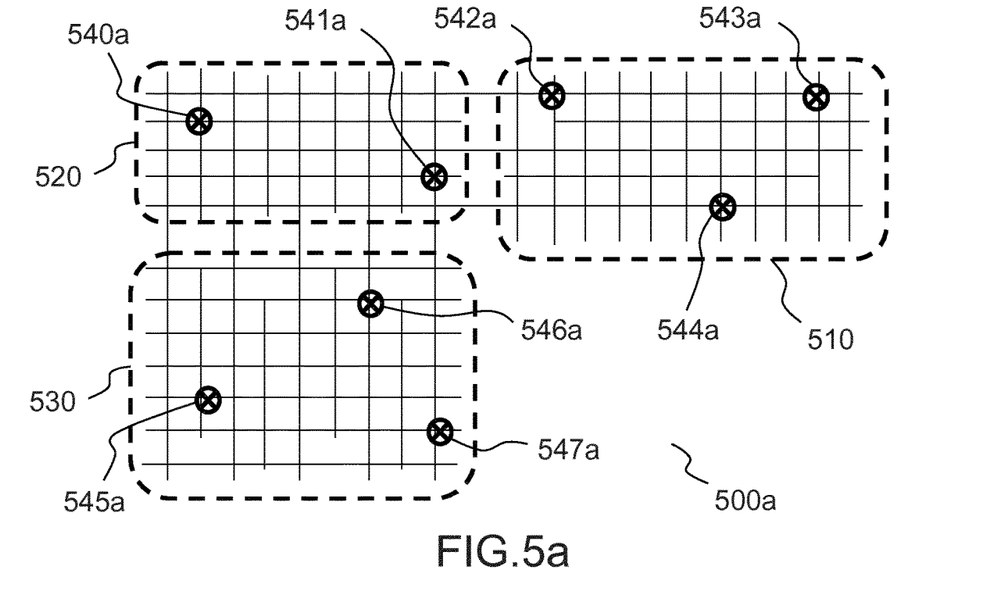
FIGS. 5a and 5b display two different separations of a water distribution network into sub-networks, in different embodiments of the invention.
Figure 5B:
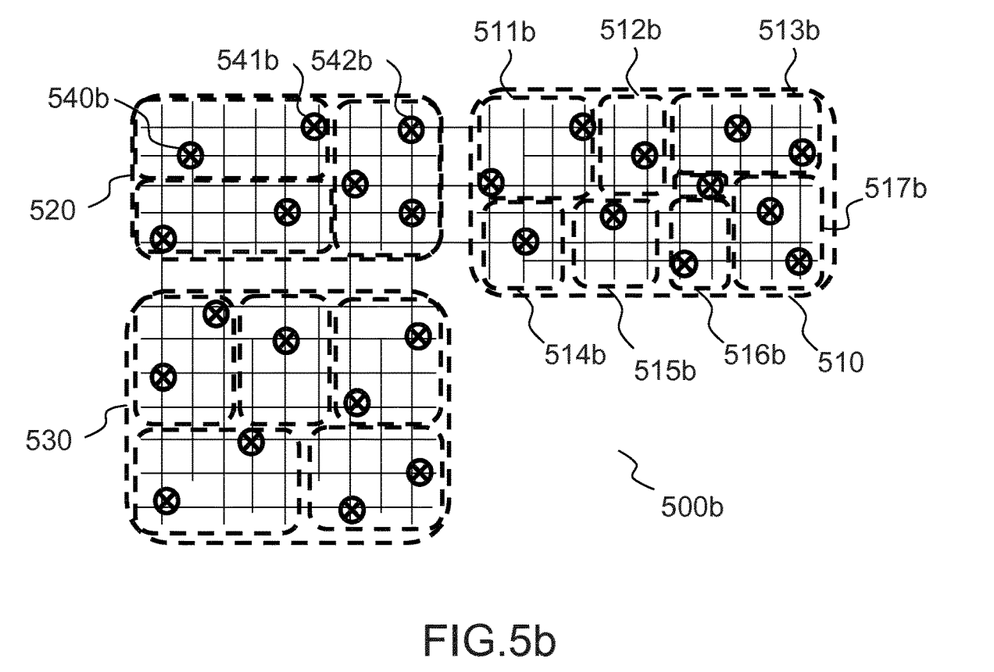

FIGS. 5a and 5b display two different separations of a water distribution network into sub-networks, in different embodiments of the invention.

FIG. 5a displays a first separation 500a of a water distribution network, into three sub-networks 510, 520, 530 in an embodiment or the invention. The water distribution network is equipped with a plurality of pressure sensors 540a, 541a, 542a, 543a, 544a, 545a, 546a and 547a. The pressure sensors allow acquiring observations, and use a method of the invention, for example the method 300.

FIG. 5b displays a second separation 500b of the water distribution network in a plurality of sub-networks. Each one of the sub-networks 510, 520, 530 is split into a plurality of smaller sub-networks. For example the sub-network 510 is split into smaller sub-networks 511b, 512b, 513b, 514b, 515b, 516b, and 517b. The network is equipped with a plurality of pressure sensors, represented by crosses within circles, for example the pressure sensors 540b, 541b, and 542b.

These examples demonstrate that it is possible using the invention to separate a water distribution network into sub-networks in different manners, without closing valves. Meanwhile, the limits of the sub-networks can be adjusted at any moment.

Figure 6A:
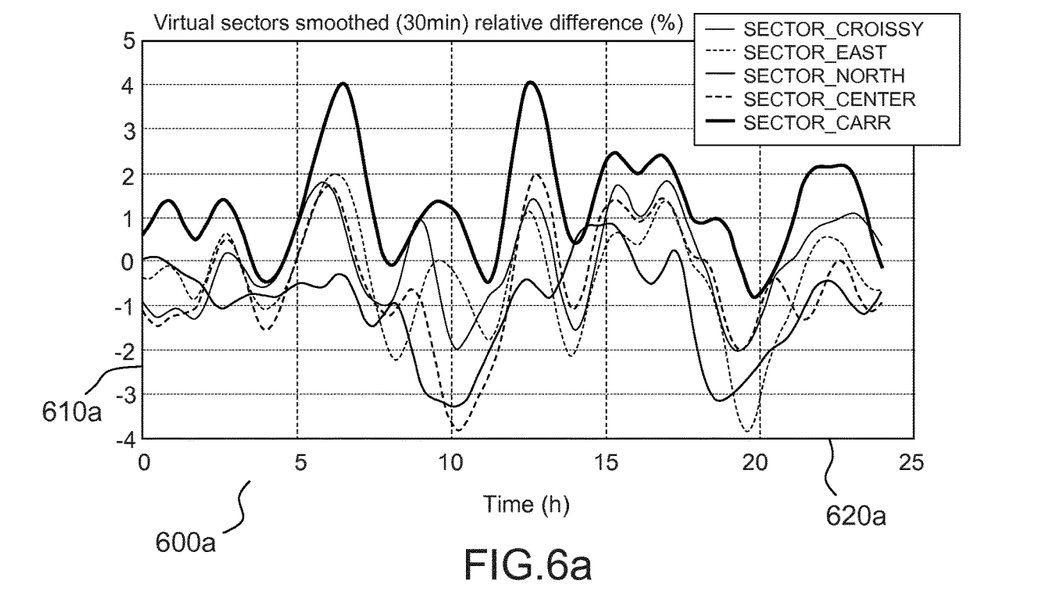
FIGS. 6a and 6b display results of an estimation of sub-networks inflows in an embodiment of the invention.
Figure 6B:
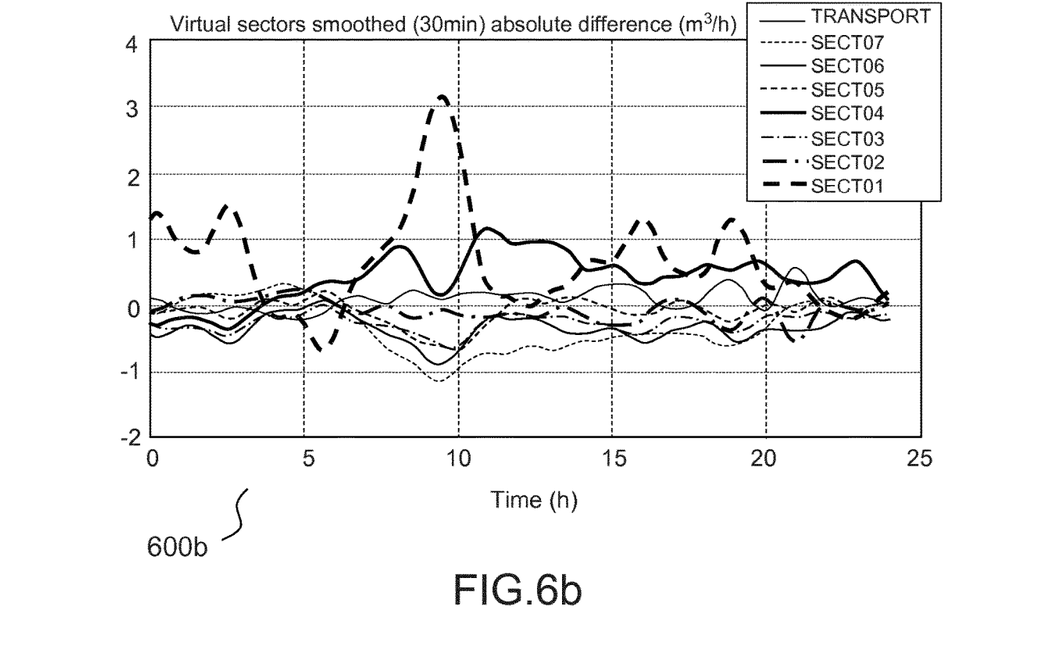

FIGS. 6a and 6b display results of an estimation of sub-networks inflows in an embodiment of the invention.

FIG. 6a displays the result 600a of an estimation of sub-networks inflows in an embodiment of the invention. It represents, on an axis 610a, the relative difference between the estimated inflow and the real inflow in the sub-network, for different times, represented in the horizontal axis 620a. Each line represents the evolution of the relative difference for a different sector.

FIG. 6b displays the result 600b of an estimation of sub-networks inflows in an embodiment of the invention. It represents, on the vertical axis, the absolute difference, in $m^3/h$, between the estimated inflow and the real inflow in the sub-network, for different times, represented in the horizontal axis. Each line represents the evolution of the absolute difference for a different sector.

These examples demonstrate that the invention allows, both in relative and absolute terms, a precise estimation of water flows at boundaries of a sub-network, at any time of the day.

The examples described above are given as illustrations of embodiments of the invention. They do not in any way limit the scope of the invention which is defined by the following claims.

The invention claimed is:

1. A method for estimating, for a water distribution network composed of nodes and arcs, one or more water flow rates at boundaries of a sub-network of the water distribution network, the water distribution network being modeled as a graph, and the sub-network being defined as a connected subgraph of the graph, the method comprising:
    defining parameters of a hydraulic model of the water distribution network with a set of values of control variables characterizing a prediction of an input of the water distribution network and an output of the water distribution network at the nodes over a set of time references;
    using sensors on a subset of the nodes and/or the arcs of the water distribution network to acquire observations of a subset of state variables of the water distribution network at the subset of the nodes and arcs at successive time references, the state variables characterizing a physical parameter and/or a physical value at the arcs and/or at the nodes at the successive time references, the sensors comprising at least one sensor of pressure, at least one sensor of flow rate, or at least one sensor of water level of water tanks, the sub-network being any sub-network of the water distribution network, wherein at least one arc at boundaries of the sub-network and at least one of the nodes at boundaries of the sub-network do not belong to the subset of the nodes and/or the arcs;
    calculating predicted values of the state variables of the network according to the hydraulic model;
    calculating a difference between the observations of a subset of state variables of the water distribution network and the predicted values of the state variables of the network;
    determining the set of values of control variables which minimize differences between the prediction and the observations of the subset of state variables by applying an optimization procedure, wherein the optimization procedure comprises a stepwise adjustment of the set of values of control variables; and
    calculating, using the hydraulic model parameterized with the determined set of values of control variables which minimize the differences between the prediction and the observations of the subset of state variables, the one or more water flow rates at boundaries of the sub-network, for a period of time.

2. The method of claim 1, wherein the sensors on the water distribution network acquire measurements at least relative to water pressure at a subset of nodes of the water distribution network.

3. The method of claim 1, wherein the sub-network is predefined, and the sensors of the water distribution network are iteratively placed in order to limit, at each iteration, one of a maximum distance or a maximum pseudo-distance between any sensor and any node.

4. The method of claim 1, wherein said optimization procedure comprises a stepwise adjustment of the set of values of control variables and a break criterion based on residue values of the subset of the state variables, said break criterion meaning that the residue values are small enough for considering that values of control variables accurately describe the water distribution network.

5. The method of claim 4, wherein the stepwise adjustment of the control variables comprises:
    A) changing the set of values of the control variables;
    B) using the hydraulic model to calculate predicted values of the subset of state variables characterizing at least water velocity at arcs and pressure at the nodes at the successive time references;

C) computing the residue values of the subset of the state variables as a difference between predicted values and observed values at the successive time references; and D) changing the set of values of the control variables and going back to step B) if said difference does not satisfy the break criterion.

6. The method of claim 5, wherein said changing the set of values of the control variables comprises adding control variables in the set of control variables.

7. The method of claim 5, wherein computing the residue values of the subset of the state variables comprises calculating values of one of a least square, Bayesian objective function or absolute error function, and changing the set of values of control variables is determined by an iterative method comprising calculating one of a gradient, or a gradient and a Hessian.

8. The method of claim 1, wherein the control variables comprise one or more of constant or time-based consumption profiles of users.

9. The method of claim 8, wherein the time-based consumption profiles of users are defined for a plurality of different categories of users.

10. The method of claim 8, wherein the control variables further comprise an estimation of water loss coefficient in the sub-network.

11. The method of claim 8, wherein the control variables further comprise an estimate of a water loss coefficient for at least one area, said at least one area comprising at least a node based on a distance or a pseudo-distance to the sensors.

12. A system comprising: sensors of at least one of pressure, flow rate or water level of water tanks; a computing device comprising a processor; communication links between sensors and one of the computing device or a measurement acquisition system; and a non-transitory computer-readable medium, wherein the computing device is configured for: executing the method according to claim 1.

13. A computer program product, stored on a non-transitory computer-readable medium, comprising code instructions for executing the method according to claim 1.

14. The method of claim 1, further comprising: implementing a computing device comprising a processor; and implementing communication links between the sensors and one of the computing device or a measurement acquisition system.

* * * * *